(12) United States Patent
Masubuchi et al.

(10) Patent No.: US 9,127,599 B2
(45) Date of Patent: Sep. 8, 2015

(54) CONTROL SYSTEM FOR MULTI-FUEL INTERNAL COMBUSTION ENGINE

(75) Inventors: Masahiko Masubuchi, Mishima (JP); Takashi Hotta, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 160 days.

(21) Appl. No.: 14/009,631

(22) PCT Filed: Apr. 8, 2011

(86) PCT No.: PCT/JP2011/058931
§ 371 (c)(1),
(2), (4) Date: Oct. 3, 2013

(87) PCT Pub. No.: WO2012/137351
PCT Pub. Date: Oct. 11, 2012

(65) Prior Publication Data
US 2014/0025277 A1    Jan. 23, 2014

(51) Int. Cl.
| F02D 19/08 | (2006.01) |
|---|---|
| F02D 19/10 | (2006.01) |
| F02D 15/04 | (2006.01) |
| F02D 15/00 | (2006.01) |
| F02B 43/00 | (2006.01) |
| F02B 43/10 | (2006.01) |

(52) U.S. Cl.
CPC ............ F02D 19/081 (2013.01); F02D 15/00 (2013.01); F02D 15/04 (2013.01); F02D 19/08 (2013.01); F02D 19/10 (2013.01); F02D 19/105 (2013.01); *F02B 43/00* (2013.01); *F02B 2043/103* (2013.01)

(58) Field of Classification Search
CPC ....... F02D 19/081; F02D 15/00; F02D 15/02; F02D 15/04; F02D 19/10; F02D 19/105; F02B 43/00; F02B 2043/103

USPC ...................... 701/104, 101–103; 123/27 GE, 123/525–527, 575–578, 48 C, 299, 300, 304
See application file for complete search history.

(56) References Cited

U.S. PATENT DOCUMENTS

| 2005/0121005 A1* | 6/2005 | Edwards ........................ 123/525 |
| 2008/0092834 A1 | 4/2008 | Stein et al. |
| 2010/0163001 A1 | 7/2010 | Akihisa et al. |

FOREIGN PATENT DOCUMENTS

| JP | 63068728 A * | 3/1988 | .............. F02D 19/06 |
| JP | 08-158980 A | 6/1996 | |
| JP | 11-257053 A | 9/1999 | |

(Continued)

*Primary Examiner* — Mahmoud Gimie
(74) *Attorney, Agent, or Firm* — Sughrue Mion, PLLC (57) ABSTRACT

The present invention is intended to suppress an excessive increase in the amount of emission of HC in a multi-fuel internal combustion engine of compression ignition type which is able to perform mixed combustion of a liquid fuel, which can be ignited by compression, and a gas fuel which has methane as a primary component. In the present invention, a required mixing ratio of the liquid fuel and the gas fuel as well as a required amount of HC emission is calculated based on an operating state of the multi-fuel internal combustion engine (S103, S104). Then, based on the required mixing ratio and the required amount of HC emission, a required compression ratio is calculated which is a compression ratio at which an amount of HC emission from the multi-fuel internal combustion engine becomes the required amount of HC emission (S105), and the compression ratio of the multi-fuel internal combustion engine is controlled to the required compression ratio (S107).

2 Claims, 7 Drawing Sheets

(56) References Cited

FOREIGN PATENT DOCUMENTS

| JP | 2008-002328 A | 1/2008 |
| JP | 2008-106766 A | 5/2008 |
| JP | 4259545 B2 | 4/2009 |

* cited by examiner

CONTROL SYSTEM FOR MULTI-FUEL INTERNAL COMBUSTION ENGINE

CROSS REFERENCE TO RELATED APPLICATIONS

This application is a National Stage of International Application No. PCT/JP2011/058931 filed Apr. 8, 2011, the contents of all of which are incorporated herein by reference in their entirety.

TECHNICAL FIELD

The present invention relates to a control system for a multi-fuel internal combustion engine of compression ignition type which is able to be operated by mixed combustion of a plurality of kinds of fuels.

BACKGROUND ART

In the past, there have been developed multi-fuel internal combustion engines which are able to perform the mixed combustion of a plurality of kinds of fuels such as a liquid fuel (e.g., light oil, gasoline, etc.) and a gas fuel (e.g., compressed natural gas, hydrogen gas, etc.). For example, in a first patent document, there is disclosed an auxiliary fuel ignition type gas engine which uses natural gas as main fuel and light oil as auxiliary fuel. In this auxiliary fuel ignition type gas engine, mixed combustion of light oil and natural gas is carried out by using the light oil as an ignition source. In addition, in the first patent document, there is described a technique in which at the time of light load, only light oil is supplied to the internal combustion engine, and at the time of medium load and high load, light oil and natural gas are supplied to the internal combustion engine.

In a second patent document, there is disclosed a technique with respect to an internal combustion engine which is provided with a variable compression ratio mechanism which is able to change a mechanical compression ratio.

PRIOR ART REFERENCES

Patent Documents

[First Patent Document] Japanese patent application laid-open No. H08-158980

SUMMARY OF THE INVENTION

Problems to be Solved by the Invention

In a multi-fuel internal combustion engine of compression ignition type which is able to perform the mixed combustion of a liquid fuel and a gas fuel, a fuel (e.g., compressed natural gas) having methane as a primary component may be used as the gas fuel. Here, methane has a very low ignitability and does not burn or combust easily. For that reason, in cases where the mixed combustion of the liquid fuel and the gas fuel having methane as its primary component is carried out in the internal combustion engine, there will be a fear that an amount of HC emitted from the internal combustion engine may increase in comparison with a case where only the liquid fuel is combusted.

In particular, in the compression ignition type internal combustion engine, the air fuel ratio of a mixture in a cylinder is large, and in addition, a clearance between a top face of a piston and a cylinder head at compression top dead center is small, and hence, it is difficult for a flame, which has been generated by the liquid fuel being compressed to be self-ignited, to propagate to a sufficient extent in a combustion chamber. For that reason, the combustion of the gas fuel tends to become insufficient, and as a result, it is easy for the amount of emission of HC to increase.

The present invention has been made in view of the above-mentioned problems, and an object of the present invention is to suppress an excessive increase in the amount of emission of HC in a multi-fuel internal combustion engine of compression ignition type which is able to perform mixed combustion of a liquid fuel, which can be ignited by compression, and a gas fuel, which has methane as a primary component.

Means for Solving the Problems

In a multi-fuel internal combustion engine of compression ignition type which is able to perform mixed combustion of a liquid fuel being ignitable by compression, and a gas fuel having methane as a primary component, the present invention is to control a compression ratio to a required compression ratio which is obtained based on a required mixing ratio of the liquid fuel and the gas fuel, and a required amount of HC emission.

More specifically, a control system for a multi-fuel internal combustion engine according to the present invention is a control system for a multi-fuel internal combustion engine of compression ignition type which is able to perform mixed combustion of a liquid fuel being ignitable by compression, and a gas fuel having methane as a primary component, wherein said control system is provided with:

a required mixing ratio calculation unit configured to calculate a required mixing ratio of the liquid fuel and the gas fuel based on an operating state of the multi-fuel internal combustion engine;

a mixing ratio control unit configured to control a mixing ratio of the liquid fuel and the gas fuel to said required mixing ratio;

a required HC emission amount calculation unit configured to calculate a required amount of HC emission based on the operating state of the multi-fuel internal combustion engine;

a required compression ratio calculation unit configured to calculate, based on said required mixing ratio and said required amount of HC emission, a required compression ratio which is a compression ratio at which an amount of HC emission from said multi-fuel internal combustion engine becomes said required amount of HC emission; and a compression ratio control unit configured to control a compression ratio of said multi-fuel internal combustion engine to said required compression ratio.

The multi-fuel internal combustion engine (hereinafter also referred to simply as an internal combustion engine) according to the present invention is provided with a compression ratio control unit configured to be able to control the compression ratio in a variable manner. Here, the compression ratio control unit may be one which is configured to control a mechanical compression ratio by changing the volume of a combustion chamber, or may be one which is configured to control an actual compression ratio by changing the valve closing timing of an intake valve.

Then, the compression ratio of the internal combustion engine is controlled to the required compression ratio which is obtained based on the required mixing ratio of the liquid fuel and the gas fuel and the required amount of HC emission. As a result of this, the amount of HC emission from the internal combustion engine can be controlled to the required amount of HC emission. Accordingly, an excessive increase in the amount of HC emission can be suppressed.

The higher the compression ratio of the internal combustion engine, the higher become the temperature and pressure in the interior of the combustion chamber, thus making it possible to improve the ignitability and combustibility (combustion characteristics) of the fuels. Accordingly, in the present invention, the required compression ratio calculation unit may calculate said required compression ratio in such a manner that the higher the proportion of the gas fuel in said required mixing ratio, and the smaller said required amount of HC emission, the higher becomes said required compression ratio. As a result, an increase in the amount of emission of HC can be suppressed in a more effective manner.

Effect of the Invention

According to the present invention, it is possible to suppress an excessive increase in the amount of emission of HC in a multi-fuel internal combustion engine of compression ignition type which is able to perform mixed combustion of a liquid fuel, which can be ignited by compression, and a gas fuel, which has methane as a primary component.

MODES FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment

Schematic Construction

Figure 1:
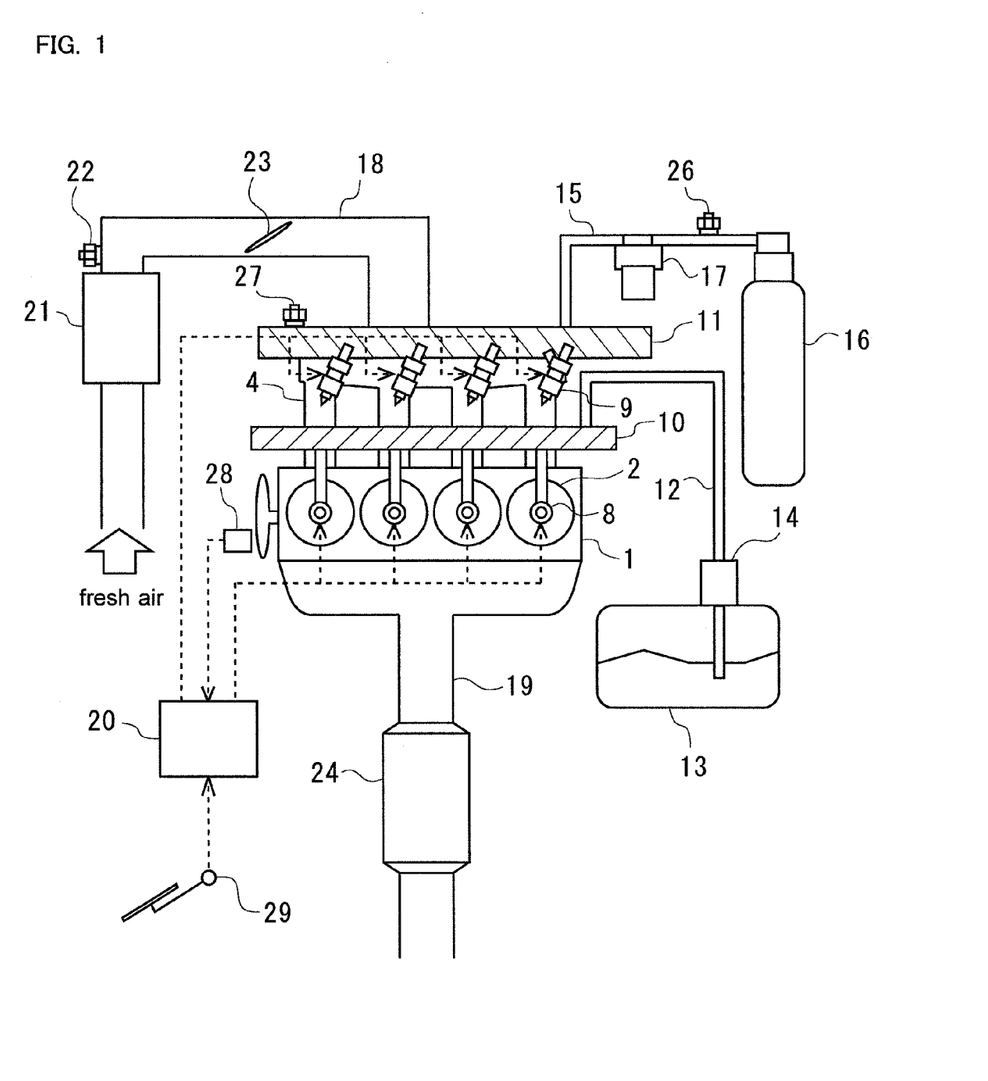
FIG. 1 is a first view showing the schematic construction of an internal combustion engine as well as its fuel system and its intake and exhaust systems according to an embodiment of the present invention.
Figure 2:
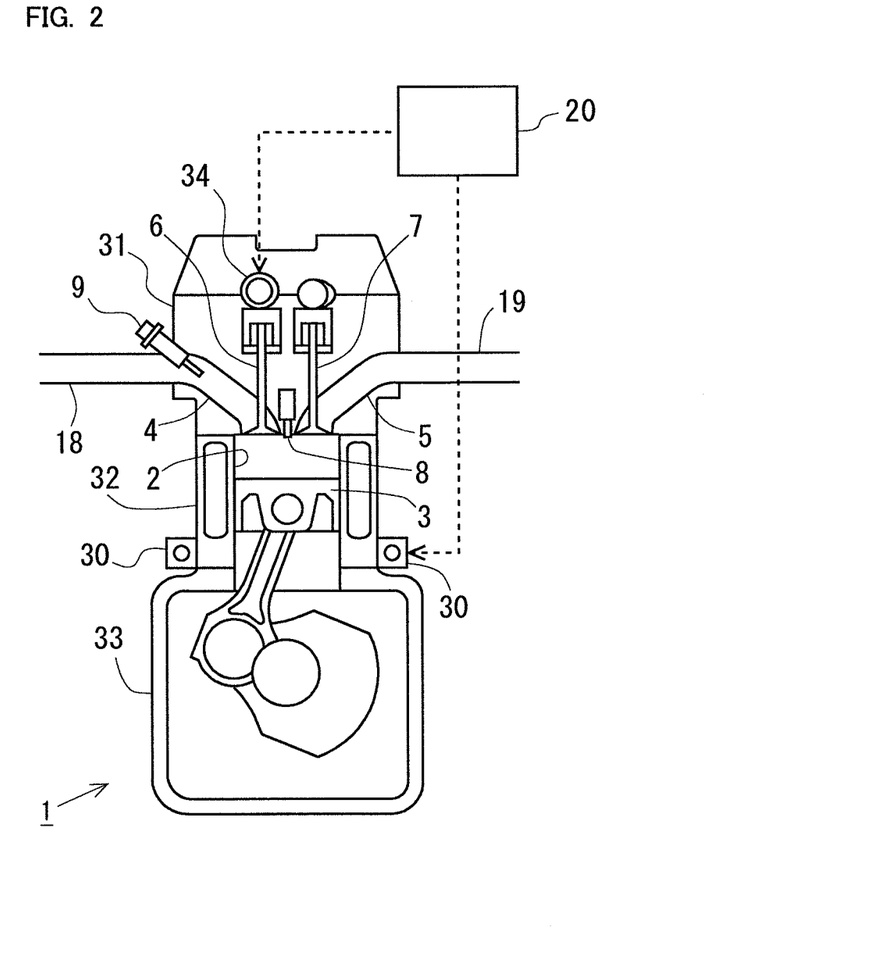
FIG. 2 is a second view showing the schematic construction of an internal combustion engine as well as its fuel system and its intake and exhaust systems according to the embodiment of the present invention.

FIGS. 1 and 2 are views showing the schematic construction of an internal combustion engine as well as its fuel system and its intake and exhaust systems according to an embodiment of the present invention. The internal combustion engine 1 is an engine for driving a vehicle, which is able to use light oil and compressed natural gas (hereinafter referred to as CNG) as fuels. The internal combustion engine 1 is a compression ignition type internal combustion engine. The internal combustion engine 1 can be operated by combusting or burning light oil and CNG in a mixed manner, or can also be operated by combusting or burning only light oil.

The internal combustion engine 1 has four cylinders 2. As shown in FIG. 2, a piston 3 is arranged inside each cylinder 2 of the internal combustion engine 1 for sliding movement relative thereto. An intake port 4 and an exhaust port 5 are connected to a combustion chamber in an upper portion of the interior of each cylinder 2. An opening portion of the intake port 4 and an opening portion of the exhaust port 5 to the combustion chamber are opened and closed by an intake valve 6 and an exhaust valve 7, respectively. An intake passage 18 is connected to the intake port 4. An exhaust passage 19 is connected to the exhaust port 5.

In the intake passage 18, there are arranged an air cleaner 21, an air flow meter 22 and a throttle valve 23 sequentially in this order from an upstream side along the flow of fresh air. The air flow meter 22 detects an amount of intake air sucked into the internal combustion engine 1. The throttle valve 23 controls the amount of intake air in the internal combustion engine 1 by changing the cross-sectional area in a direction which crosses at right angles with the direction of flow of the intake air in the intake passage. An exhaust gas purification device 24 is arranged in the exhaust passage 19. The exhaust gas purification device 24 is composed of an exhaust gas purification catalyst such as an oxidation catalyst, a NOx storage reduction catalyst, etc., and a particulate filter or the like which serves to trap particulate matter in the exhaust gas.

Each of the cylinders 2 is provided with a light oil injector 8 that directly injects light oil into a corresponding cylinder 2. The individual light oil injectors 8 are connected to a light oil common rail 10. A light oil supply passage 12 has one end thereof connected to the light oil common rail 10. The light oil supply passage 12 has the other end thereof connected to a light oil tank 13. A pump 14 is arranged in the light oil supply passage 12. Light oil is pressure fed from the light oil tank 13 to the light oil common rail 10 through the light oil supply passage 12 by means of the pump 14. Then, the light oil pressurized in the light oil common rail 10 is supplied to the individual light oil injectors 8, respectively.

In addition, in the internal combustion engine 1, there are also provided CNG injectors 9 for injecting CNG into intake ports 4 of the individual cylinders 2, respectively. The individual CNG injectors 9 are connected to a CNG delivery pipe 11. A CNG supply passage 15 has one end thereof connected to the CNG delivery pipe 11. The CNG supply passage 15 has the other end thereof connected to a CNG tank 16. CNG is supplied from the CNG tank 16 to the CNG delivery pipe 11 through the CNG supply passage 15. Then, CNG is supplied from the CNG delivery pipe 11 to the individual CNG injectors 9, respectively.

A regulator 17 is arranged in the CNG supply passage 15. The pressure of the CNG to be supplied to the CNG delivery pipe 11 is regulated by the regulator 17. A pressure sensor 26 is arranged in the CNG supply passage 15 at the upstream side of the regulator 17, and a pressure sensor 27 is arranged in the CNG delivery pipe 11. These pressure sensors 26, 27 serve to detect the pressure of CNG inside the CNG supply passage 15 and the pressure of CNG inside the CNG delivery pipe 11, respectively.

In cases where the internal combustion engine 1 is operated by carrying out mixed combustion of light oil and CNG, first, CNG is injected into an intake port 4 of each cylinder 2 from a corresponding CNG injector 9. As a result of this, a pre-mixed gas of intake air (air) and CNG is formed, and the pre-mixed gas is supplied into each cylinder 2. Then, in each cylinder 2, in the vicinity of compression top dead center, light oil is injected into the cylinder 2 from a corresponding light oil injector 8. When the light oil is self-ignited, a flame propagates in a combustion chamber. As a result of this, the light oil and CNG are combusted or burned. In other words, the CNG is combusted or burned using the light oil as an ignition source.

In addition, a variable compression ratio mechanism 30 is connected to the internal combustion engine 1, as shown in FIG. 2. The variable compression ratio mechanism 30 is a mechanism which is able to move a cylinder block 32 in an axial direction of each cylinder 2 (in a vertical direction in FIG. 2) with respect to a crankcase 33. When the cylinder block 32 is caused to move in the vertical direction with respect to the crankcase 33 (according to this, a cylinder head 31 is also caused to move in the vertical direction in unison with the cylinder block 32), a clearance between the top face of each piston 3 and the cylinder head 31 at compression top dead center changes. With this, the volume of each combustion chamber changes, as a result of which a mechanical compression ratio also changes. For example, when the cylinder block 32 moves in an upward direction in FIG. 2 (i.e., the cylinder block 32 and the crankcase 33 move in directions away from each other), the clearance between the top face of each piston 3 and the cylinder head 31 at compression top dead center becomes larger. As a result of this, the volume of each combustion chamber increases, so that the mechanical compression ratio decreases.

Here, note that as the variable compression ratio mechanism 30 according to this embodiment, there may be adopted a mechanism of any well-known type as long as it is able to change the mechanical compression ratio thereof.

In addition, the internal combustion engine 1 is provided with intake side variable valve drive mechanisms (hereinafter, referred to as intake side VVT) 34, as shown in FIG. 2. Each of the intake side VVT 34 is a mechanism which is able to control the valve timing of an intake valve 6 in a variable manner. The actual compression ratio of the internal combustion engine 1 can be changed by changing the valve closing timing of the intake valves 6 by means of the intake side VVT 34, respectively. For example, when the valve closing timing of each intake valve 6 is caused to retard, the actual compression ratio of the internal combustion engine 1 is decreased.

An electronic control unit (ECU) 20 is provided in combination with the internal combustion engine 1. The air flow meter 22 and the pressure sensors 26, 27 are electrically connected to the ECU 20. Moreover, a crank angle sensor 28 and an accelerator opening sensor 29 are electrically connected to the ECU 20.

The crank angle sensor 28 detects a crank angle of the internal combustion engine 1. The accelerator opening sensor 29 detects a degree of opening of an accelerator of a vehicle on which the internal combustion engine 1 is mounted. The output signals of these individual sensors are inputted to the ECU 20. The ECU 20 calculates an engine rotational speed of the internal combustion engine 1 based on the output signal of the crank angle sensor 28, and also calculates an engine load of the internal combustion engine 1 based on the output signal of the accelerator opening sensor 29.

In addition, the light oil injectors 8, the CNG injectors 9, the pump 14, the regulator 17, the throttle valve 23, and the variable compression ratio mechanism 30 and the intake side VVT 34 are electrically connected to the ECU 20. Thus, these parts are controlled by the ECU 20.

The ECU 20 selects, as its combustion mode, either one of the mixed combustion of light oil and CNG, and the combustion of only light oil, based on an operating state of the internal combustion engine 1. Then, the ECU 20 controls the light oil injectors 8 and the CNG injectors 9 according to the selected combustion mode.

[Compression Ratio Control]

CNG, being composed of methane as its primary component, has a very low ignitability, and is difficult to burn or combust. For that reason, in cases where mixed combustion of light fuel and CNG is carried out in the internal combustion engine 1, combustion of CNG may become insufficient. As a result, in comparison with the case where combustion of only light oil is carried out in the internal combustion engine 1, there is a fear that an amount of HC emission from the internal combustion engine 1 may increase.

Accordingly, when the mixed combustion of light oil and CNG is carried out in the internal combustion engine 1, the compression ratio of the internal combustion engine 1 is controlled so as to suppress an excessive increase in the amount of HC emission from the internal combustion engine 1. Hereinafter, reference will be made to the control on the compression ratio of the internal combustion engine according to this embodiment based on FIGS. 3 through 6.

Figure 3:
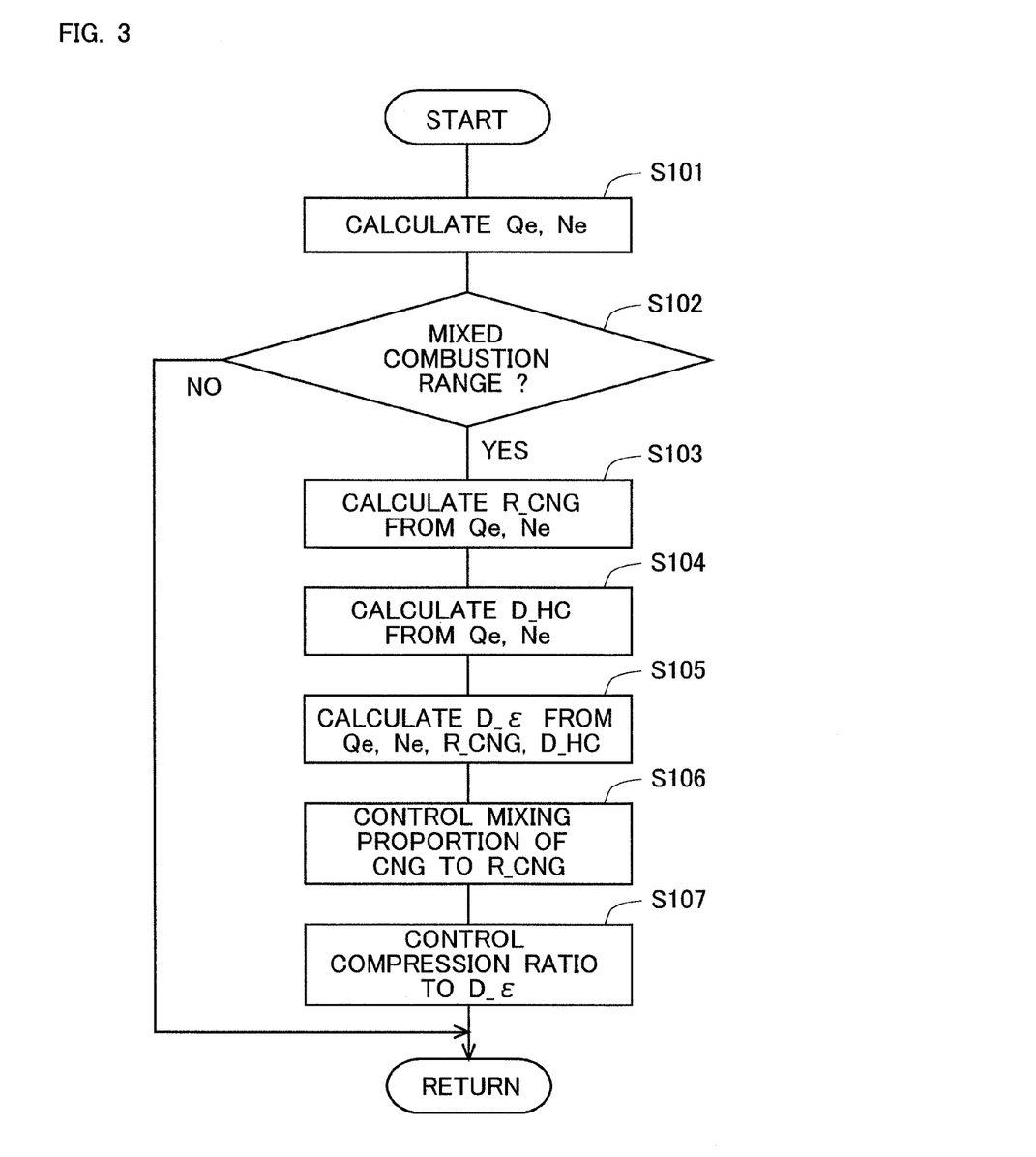
FIG. 3 is a flow chart showing a flow of compression ratio control according to the embodiment of the present invention.

FIG. 3 is a flow chart showing a flow of the compression ratio control according to this embodiment. This flow has been beforehand stored in the ECU 20, and is repeatedly carried out by the ECU 20 at a predetermined interval.

In this flow, first in step S101, an engine load Qe and an engine rotational speed Ne of the internal combustion engine 1 are calculated. Then, in step S102, it is determined, based on the engine load Qe and the engine rotational speed Ne, whether the operating state of the internal combustion engine 1 belongs to a mixed combustion region in which the mixed combustion of light oil and CNG is selected as a combustion mode. The relation among the engine load Qe, the engine rotational speed Ne, and the combustion mode has been set or defined in advance based on experiments, etc., and stored in the ECU 20 as a map. In step S102, by using this map, it is determined whether the operating state of the internal combustion engine 1 belongs to the mixed combustion region.

When a negative determination is made in step S102, the execution of this flow is once ended. In this case, the combustion of only light oil is selected as the combustion mode of the internal combustion engine 1. Then, the compression ratio of the internal combustion engine 1 is controlled to a compression ratio which corresponds to the combustion of only light oil. On the other hand, in cases where an affirmative determination is made in step S102, the processing of step S103 is then carried out.

In step S103, a required CNG mixing ratio R_CNG is calculated based on the engine load Qe and the engine rotational speed Ne of the internal combustion engine 1. The required CNG mixing ratio R_CNG is a required value of the mixing ratio or proportion of CNG in the fuels supplied to the internal combustion engine 1. The relation among the engine load Qe and the engine rotational speed Ne of the internal combustion engine 1, and the required CNG mixing ratio R_CNG has been set in advance based on experiments, etc., and stored in the ECU 20 as a map, as shown in FIG. 4.

Figure 4:
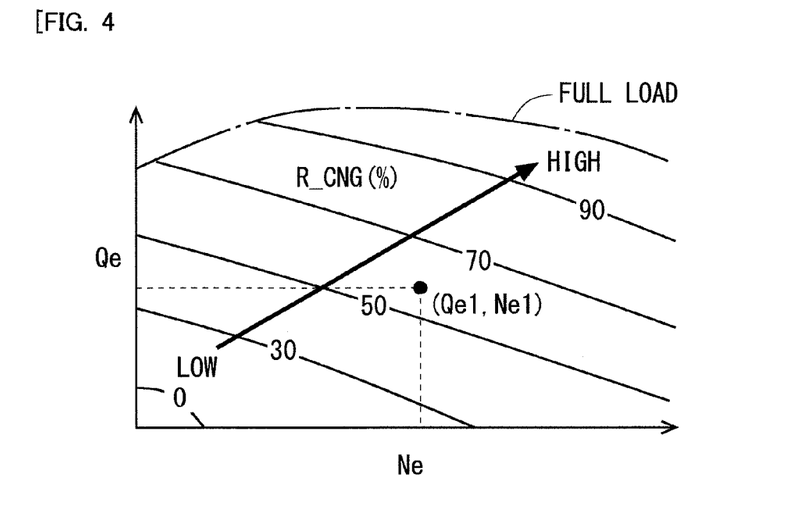
FIG. 4 is a map showing the relation among an engine load Qe, an engine rotational speed Ne, and a required CNG mixing ratio R_CNG according to the embodiment of the present invention.

In FIG. 4, the axis of ordinate represents the engine load Qe, and the axis of abscissa represents the engine rotational speed Ne. In this map, the higher the engine load Qe, and the higher the engine rotational speed Ne, the higher becomes the required CNG mixing ratio R_CNG. This is because the higher the engine load Qe, and the higher the engine rotational speed Ne, the easier it becomes for combustion to occur in each cylinder 2, thereby making it possible to increase the proportion of CNG in the fuels. In step S103, the required CNG mixing ratio R_CNG is calculated by using the map.

Here, note that the relation among the engine load Qe and the engine rotational speed Ne of the internal combustion engine 1, and the required CNG mixing ratio R_CNG may have been stored in the ECU 20 as a function. In this case, the required CNG mixing ratio R_CNG is calculated by using this function.

Subsequently, in step S104, a required amount of HC emission D_HC is calculated based on the engine load Qe and the engine rotational speed Ne of the internal combustion engine 1. The required amount of HC emission D_HC is a required value of the amount of HC emission from the internal combustion engine 1. The relation among the engine load Qe and the engine rotational speed Ne of the internal combustion engine 1, and the required amount of HC emission D_HC has been set or defined in advance based on experiments, etc., and stored in the ECU 20 as a map, as shown in FIG. 5.

Figure 5:
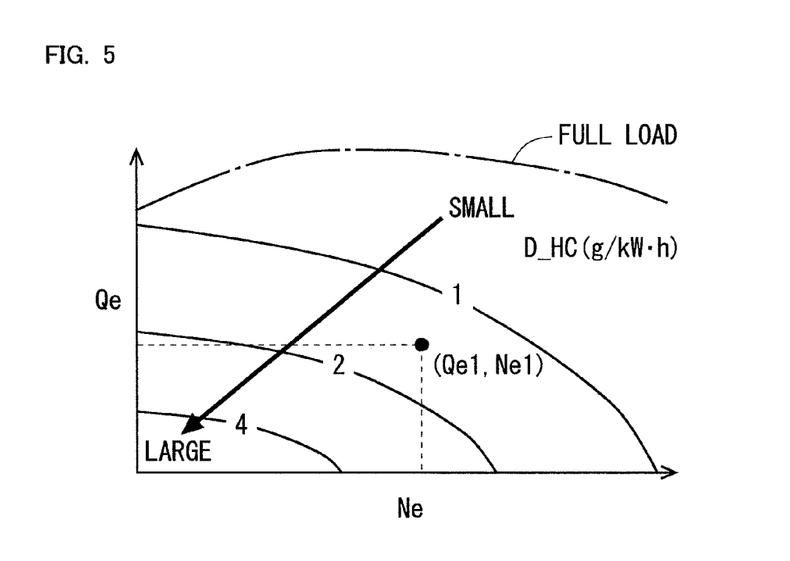
FIG. 5 is a map showing the relation among the engine load Qe, the engine rotational speed Ne, and a required amount of HC emission D_HC according to the embodiment of the present invention.

In FIG. 5, the axis of ordinate represents the engine load Qe, and the axis of abscissa represents the engine rotational speed Ne. In this map, the lower the engine load Qe, and the lower the engine rotational speed Ne, the larger becomes the required amount of HC emission D_HC. This is because the lower the engine load Qe, and the lower the engine rotational speed Ne, the more difficult it becomes for combustion to occur in each cylinder 2, thereby making it easy to increase the amount of HC emission from the internal combustion engine 1. In step S104, the required amount of HC emission D_HC is calculated by using the map.

Here, note that the relation among the engine load Qe and the engine rotational speed Ne of the internal combustion engine 1, and the required amount of HC emission D_HC may have been stored in the ECU 20 as a function. In this case, the required amount of HC emission D_HC is calculated by using this function.

Then, in step S105, a required compression ratio D_$\epsilon$ is calculated based on the engine load Qe and the engine rotational speed Ne of the internal combustion engine 1, the required CNG mixing ratio R_CNG, and the required amount of HC emission D_HC. The required compression ratio D_$\epsilon$ is a required value of the compression ratio of the internal combustion engine 1, and is a compression ratio at which the amount of HC emission from the internal combustion engine 1 becomes the required amount of HC emission D_HC. The relation among the engine load Qe, the engine rotational speed Ne, the required CNG mixing ratio R_CNG, the required amount of HC emission D_HC, and the required compression ratio D_$\epsilon$ has been set or defined in advance based on experiments, etc., and stored in the ECU 20 as maps, as shown in FIG. 6.

Figure 6:
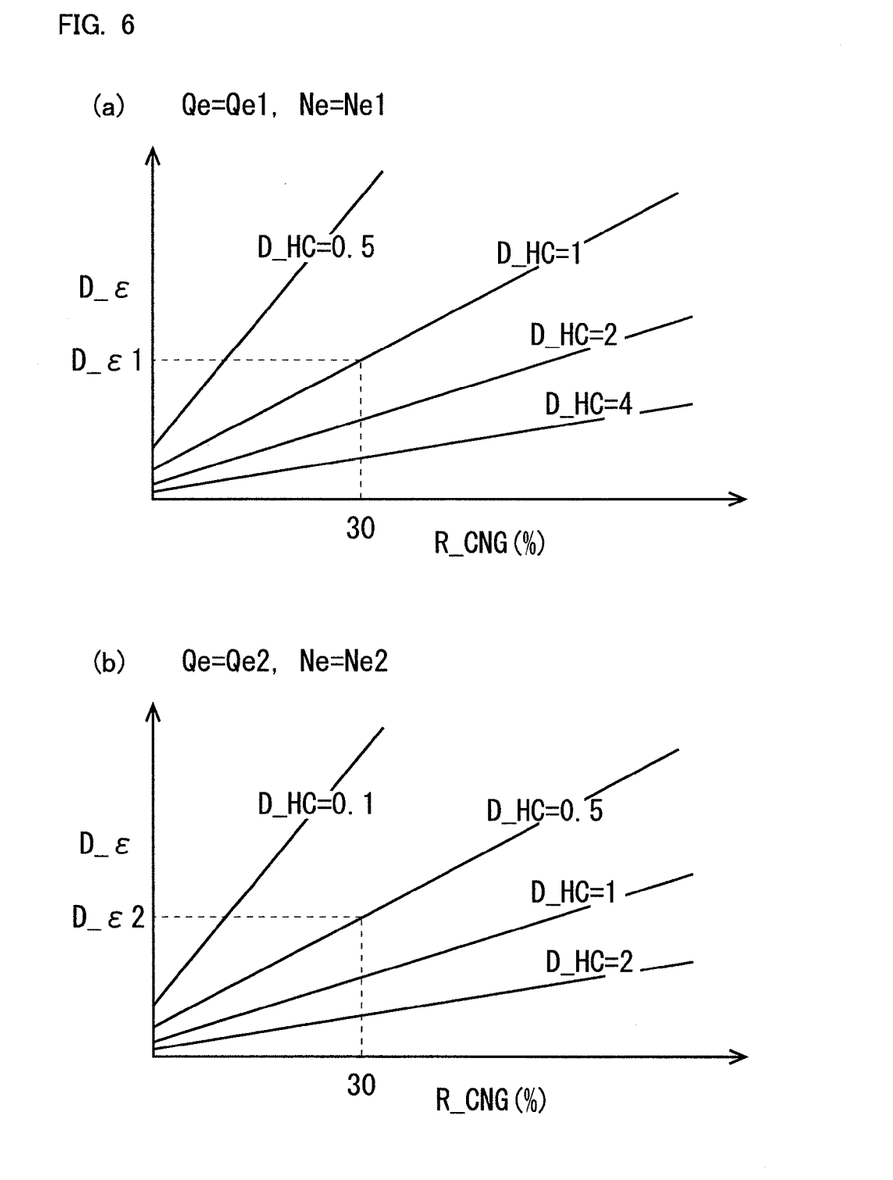
FIG. 6 is maps showing the relation among the engine load Qe, the engine rotational speed Ne, the required CNG mixing ratio R_CNG, the required amount of HC emission D_HC, and a required compression ratio D_$\epsilon$ according to the embodiment of the present invention.

FIG. 6(*a*) is a map showing the relation among the required CNG mixing ratio R_CNG, the required amount of HC emission D_HC, and the required compression ratio D_$\epsilon$, at the time when the engine load Qe is Qe1 and the engine rotational speed Ne is Ne1. Also, FIG. 6(*b*) is a map showing the relation among the required CNG mixing ratio R_CNG, the required amount of HC emission D_HC, and the required compression ratio D_$\epsilon$, at the time when the engine load Qe is Qe2 and the engine rotational speed Ne is Ne2. In this manner, in this embodiment, there are provided a plurality of maps which show the relation among the required CNG mixing ratio R_CNG, the required amount of HC emission D_HC, and the required compression ratio D_$\epsilon$, and which correspond to individual values of the engine load Qe and the engine rotational speed Ne, respectively. These maps have been stored in the ECU 20.

In FIGS. 6(*a*) and 6(*b*), the axis of ordinate represents the required compression ratio D_$\epsilon$, and the axis of abscissa represents the required CNG mixing ratio R_CNG. And, each solid line in FIGS. 6(*a*) and 6(*b*) indicates the relation between the required CNG mixing ratio R_CNG and the required compression ratio D_$\epsilon$ according to each value of the required amount of HC emission D_HC.

In these maps, the higher the required CNG mixing ratio R_CNG, the higher becomes the required compression ratio D_$\epsilon$. In addition, the smaller the required amount of HC emission D_HC, the higher becomes the required compression ratio D_$\epsilon$. This is because the higher the required CNG mixing ratio R_CNG, and the smaller the required amount of HC emission D_HC, the more it is necessary to enhance ignitability and combustibility (combustion characteristic) of the fuels. The higher the compression ratio of the internal combustion engine 1, the higher become the temperature and pressure in the interior of each combustion chamber, thus making it possible to improve the ignitability and combustibility of the fuels.

Then, in step S105, the required compression ratio D_$\epsilon$ is calculated by using these maps. For example, at the time when the required CNG mixing ratio R_CNG is 30% and the required amount of HC emission D_HC is 1 g/kW·h, in the case where the engine load Qe is Qe1 and the engine rotational speed Ne is Ne1, the value of the required compression ratio D_$\epsilon$ is calculated as D_$\epsilon$1, as shown in FIG. 6(*a*). Also, at the time when the required CNG mixing ratio R_CNG is 30% and the required amount of HC emission D_HC is 0.5 g/kW·h, in the case where the engine load Qe is Qe2 and the engine rotational speed Ne is Ne2, the value of the required compression ratio D_$\epsilon$ is calculated as D_$\epsilon$2, as shown in FIG. 6(*b*).

Here, note that the relation among the engine load Qe, the engine rotational speed Ne, the required CNG mixing ratio R_CNG, the required amount of HC emission D_HC, and the required compression ratio D_$\epsilon$ may have been stored in the ECU 20 as a function. In this case, the required compression ratio D_$\epsilon$ is calculated by using this function.

Subsequently, in step S106, by adjusting an amount of injection of light oil from each of the light oil injectors 8 and an amount of injection of CNG from each of the CNG injectors 9, the mixing ratio or proportion of CNG in the fuels to be supplied to the internal combustion engine 1 is controlled by the required CNG mixing ratio R_CNG calculated in step S103.

Thereafter, in step S107, the compression ratio of the internal combustion engine 1 is controlled to the required compression ratio D_E calculated in step S105. The control of the compression ratio may be carried out by controlling the mechanical compression ratio with the use of the variable compression ratio mechanism 30, or by controlling the actual compression ratio with the use of the intake side VVT 34. Moreover, the compression ratio may be controlled to the required compression ratio D_$\epsilon$ by using both the variable compression ratio mechanism 30 and the intake side VVT 34.

According to the above-mentioned flow, in cases where the mixed combustion of light fuel and CNG is carried out in the internal combustion engine 1, the required compression ratio $D\_\epsilon$ is calculated based on the engine load Qe, the engine rotational speed Ne, the required CNG mixing ratio R_CNG, and the required amount of HC emission D_HC. Then, the compression ratio of the internal combustion engine 1 is controlled to the required compression ratio $D\_\epsilon$. That is, the higher the required CNG mixing ratio R_CNG, and the smaller the required amount of HC emission D_HC, the higher is made the compression ratio of the internal combustion engine 1. As a result of this, the amount of HC emission from the internal combustion engine 1 can be controlled to the required amount of HC emission D_HC. Accordingly, in cases where the mixed combustion of light oil and CNG is carried out in the internal combustion engine 1, it is possible to suppress the amount of emission of HC from increasing excessively.

[Modification]

Reference will be made to a modification of this embodiment. In this modification, the driver of a vehicle, etc., is able to select either a combustion mode in which an amount of consumption of CNG is relatively large or a combustion mode in which an amount of consumption of CNG is relatively small, as a combustion mode in which the mixed combustion of light oil and CNG is carried out in the internal combustion engine 1. In this case, two maps including a first CNG mixing ratio map and a second CNG mixing ratio map have each been stored in the ECU 20 as a map showing the relation among the engine load Qe and the engine rotational speed Ne of the internal combustion engine 1, and the required CNG mixing ratio R_CNG. The first CNG mixing ratio map is a map for a combustion mode in which the amount of consumption of CNG is relatively large, and the second CNG mixing ratio map is a map for combustion mode in which the amount of consumption of CNG is relatively small.

In the first CNG mixing ratio map, the value of the required CNG mixing ratio R_CNG, which corresponds to the same engine load Qe and the same engine rotational speed Ne, becomes large than that in the second CNG mixing ratio map. At the time of calculating the required CNG mixing ratio R_CNG, the ECU 20 selects either the first CNG mixing ratio map or the second CNG mixing ratio map according to the combustion mode which has been selected by the driver of the vehicle, etc. Then, the ECU 20 calculates the required CNG mixing ratio R_CNG with the use of the map thus selected.

In addition, in this modification, it is possible to select the value of the required amount of HC emission D_HC in the case of the mixed combustion of light oil and CNG being carried out in the internal combustion engine 1, according to a standard or reference value for emission regulations or requirements in a sales area of the vehicle. In this case, two maps including a first HC emission amount map and a second HC emission amount map have each been stored in the ECU 20 as a map showing the relation among the engine load Qe and the engine rotational speed Ne of the internal combustion engine 1, and the required amount of HC emission D_HC. The first HC emission amount map is a map which is used when the reference value of the amount of HC emission in the emission requirements is relatively large, and the second HC emission amount map is a map which is used when the reference value of the amount of HC emission in the emission requirements is relatively small.

In the first HC emission amount map, the value of the required amount of HC emission D_HC, which corresponds to the same engine load Qe and the same engine rotational speed Ne, becomes large than that in the second HC emission amount map. At the time of calculating the required CNG mixing ratio R_CNG, the ECU 20 selects either the first HC emission amount map or the second HC emission amount map according to the emission requirements which have been inputted at the time of shipment of the vehicle, etc. Then, the ECU 20 calculates the required amount of HC emission D_HC with the use of the map thus selected.

Figure 7:
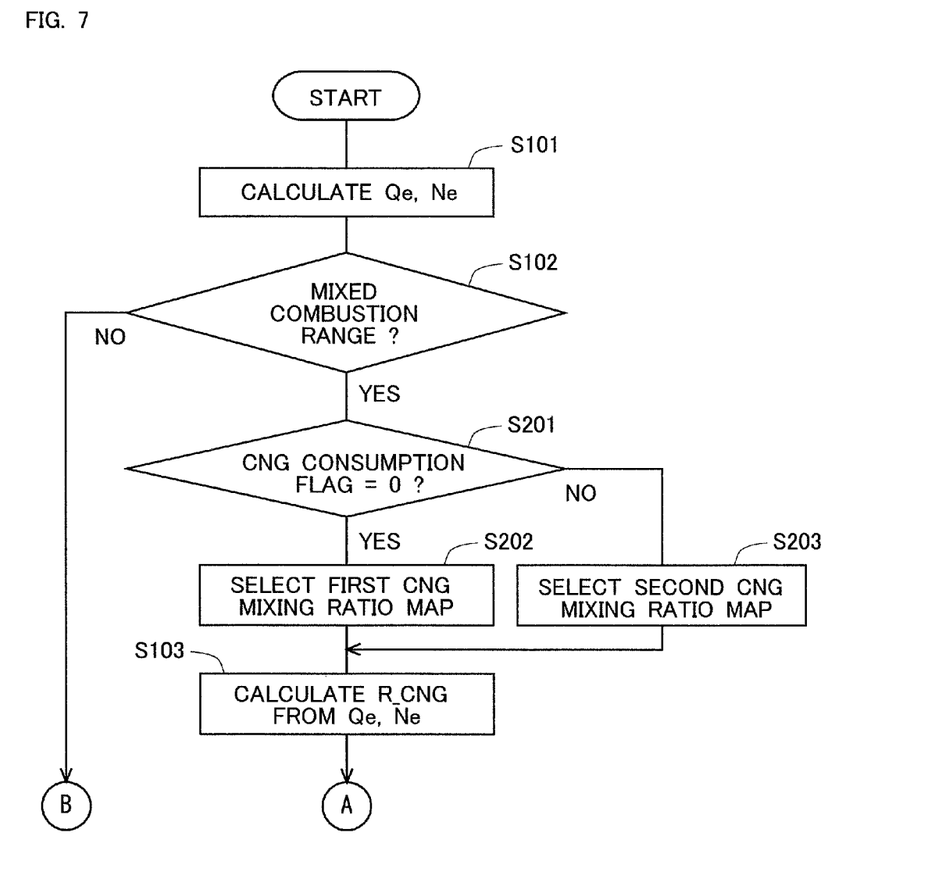
FIG. 7 is a first flow chart showing a flow of compression ratio control according to a modified form of the embodiment of the present invention.
Figure 8:
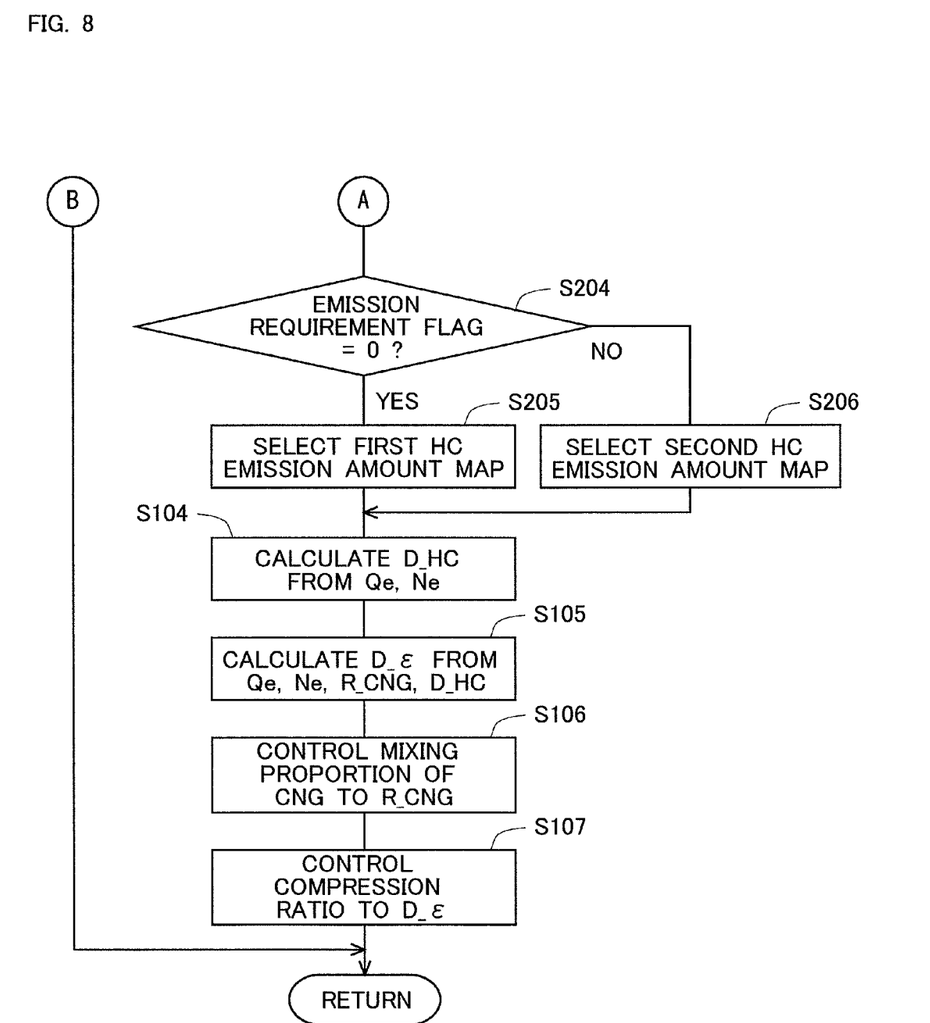
FIG. 8 is a second flow chart showing the flow of compression ratio control according to the modified form of the embodiment of the present invention.

A control flow for the compression ratio according to this modification will be described based on flow charts shown in FIGS. 7 and 8. This flow has been beforehand stored in the ECU 20, and is executed by the ECU 20 in a repeated manner. Here, note that this flow is one in which steps S201 through S206 are added to the flow shown in FIG. 3. For that reason, in the following, processing of steps S201 through S206 newly added will be mainly explained, and an explanation about those steps in which the same processing as in the flow shown in FIG. 3 is carried out will be omitted.

In this flow, in cases where an affirmative determination is made in step S102, the processing of step S201 is then carried out. In step S201, it is determined whether a CNG consumption flag stored in the ECU 20 is 0.

As described above, in this modification, either a combustion mode in which the amount of consumption of CNG is relatively large or a combustion mode in which the amount of consumption of CNG is relatively small is selected by the driver of the vehicle, etc., as a combustion mode in the internal combustion engine 1 in the case where the mixed combustion of light oil and CNG is carried out. The selection of a combustion mode is carried out by changing over a switch mounted on the vehicle, etc. Then, in cases where the combustion mode in which the amount of consumption of CNG is relatively large is selected, the CNG consumption flag stored in the ECU 20 is set to 0, whereas in cases where the combustion mode in which the amount of consumption of CNG is relatively small is selected, the CNG consumption flag stored in the ECU 20 is set to 1.

Accordingly, in cases where the combustion mode in which the amount of consumption of CNG is relatively large is selected, an affirmative determination is made in step S201, whereas in cases where the combustion mode in which the amount of consumption of CNG is relatively small is selected, a negative determination is made in step S201.

In cases where an affirmative determination is made in step S201, then in step S202, the first CNG mixing ratio map is selected as a map to be used for calculating the required CNG mixing ratio R_CNG. Subsequently, in step S103, the required CNG mixing ratio R_CNG is calculated by using the first CNG mixing ratio map. On the other hand, in cases where a negative determination is made in step S201, then in step S203, the second CNG mixing ratio map is selected as a map used for calculating the required CNG mixing ratio R_CNG. Thereafter, in step S103, the required CNG mixing ratio R_CNG is calculated by using the second CNG mixing ratio map.

In addition, processing of step S204 is carried out after the processing of step S103. In step S204, it is determined whether the emission requirement flag stored in the ECU 20 is 0.

As described above, in this modification, at the time of shipment of the vehicle, etc., the emission requirements in the sales area of the vehicle are inputted to the ECU 20. Then, in cases where the emission requirements thus inputted are such that the reference value of the amount of HC emission is relatively large, the emission requirement flag to be stored in the ECU 20 is set to 0, whereas in cases where the inputted emission requirements are such that the reference value of the amount of HC emission is relatively small, the emission requirement flag to be stored in the ECU 20 is set to 1.

Accordingly, in cases where the emission requirements in the sales area of the vehicle have a relatively large reference value of the amount of HC emission, an affirmative determination is made in step S204, whereas in cases where the emission requirements in the sales area of the vehicle have a relatively small reference value of the amount of HC emission, a negative determination is made in step S204.

In cases where an affirmative determination is made in step S204, then in step S205, the first HC emission amount map is selected as a map used for calculating the required amount of HC emission D_HC. Subsequently, in step S104, the required amount of HC emission D_HC is calculated by using the first HC emission amount map. On the other hand, in cases where a negative determination is made in step S204, then in step S206, the second HC emission amount map is selected as a map used for calculating the required amount of HC emission D_HC. Thereafter, in step S104, the required amount of HC emission D_HC is calculated by using the second HC emission amount map.

[Other Fuels in the Internal Combustion Engine]

Here, note that in this embodiment, light oil and CNG are used as fuels in the internal combustion engine 1, but the liquid fuel and the gas fuel according to the present invention are not limited to these. The liquid fuel according to the present invention may be any fuel as long as it can be ignited by compression, and for example, it may be one in which light oil and GTL are mixed with each other. In addition, the gas fuel according to the present invention may be any fuel as long as it contains methane as its primary component, and for example, it may be propane gas or butane gas. Also, in cases where fuels other than light oil and CNG are used as those for the internal combustion engine 1, a gas fuel burns or combusts while using, as an ignition source, a liquid fuel which can be ignited by compression.

EXPLANATION OF REFERENCE NUMERALS AND CHARACTERS

1 . . . internal combustion engine
2 . . . cylinders
8 . . . light oil injectors
9 . . . CNG injectors
20 . . . ECU
28 . . . crank angle sensor
29 . . . accelerator opening sensor
30 . . . variable compression ratio mechanism
34 . . . intake side variable valve drive mechanism (intake side VVT)

The invention claimed is:

1. A control system for a multi-fuel internal combustion engine of compression ignition type which is able to perform mixed combustion of a liquid fuel, being ignitable by compression, and a gas fuel having methane as a primary component, said control system comprising:
a required mixing ratio calculation unit configured to calculate a required mixing ratio of the liquid fuel and the gas fuel based on an operating state of the multi-fuel internal combustion engine;
a mixing ratio control unit configured to control a mixing ratio of the liquid fuel and the gas fuel to said required mixing ratio;
a required HC emission amount calculation unit configured to calculate a required amount of HC emission based on an engine load and a number of engine revolutions per unit time of the multi-fuel internal combustion engine;
a required compression ratio calculation unit configured to calculate, based on said required mixing ratio and said required amount of HC emission, a required compression ratio which is a compression ratio at which an amount of HC emission from said multi-fuel internal combustion engine becomes said required amount of HC emission; and
a compression ratio control unit configured to control a compression ratio of said multi-fuel internal combustion engine to said required compression ratio.

2. The control system for a multi-fuel internal combustion engine as set forth in claim 1, wherein
said required compression ratio calculation unit calculates said required compression ratio in such a manner that the higher a proportion of the gas fuel in said required mixing ratio, and the smaller said required amount of HC emission, the higher becomes said required compression ratio.

* * * * *